3,025,255
AQUEOUS ALKALINE ADHESIVE COMPRISING PHENOL-FORMALDEHYDE CONDENSATE AND POLYETHYLENE GLYCOL
Alan L. Lambuth, Bellevue, Wash., assignor to Monsanto Chemical Company, St. Louis, Mo., a corporation of Delaware
No Drawing. Filed Aug. 13, 1959, Ser. No. 833,376
4 Claims. (Cl. 260—29.3)

This invention relates to liquid phenolic resins and more particularly to water-dilutable alkaline phenol-formaldehyde condensation products having particular usefulness in wood adhesive applications.

Highly reactive alkaline phenol-formaldehyde resins are the preferred resins of the plywood industry today, primarily on the basis of their speed of cure. Since this speed is gained at the expense of resin flow properties, glue spreads must be adequate and assembly times reasonably short for satisfactory operation. A problem arises at this point, however, because for many plywood panel constructions, an "adequate" glue spread means too much moisture in too small a cross-section of wood, resulting in an excessive blistering tendency during the cure. The problem is especially acute with plywood panels having resin-impregnated paper overlay faces. If the spreads are reduced to meet this problem, the assembly time tolerance suffers accordingly.

Accordingly it is an object of the present invention to provide novel liquid alkaline phenol-formaldehyde resin adhesive compositions.

A further object is to provide resin compositions of the preceding type having high order reactivity.

Other objects of the invention will in part be obvious and will in part appear hereinafter.

These and other objects are attained in a liquid resin composition which results from modifying a liquid alkaline phenol-formaldehyde resin with a small amount of a solid polyethylene glycol.

The following examples are given in illustration of this invention. Where parts are mentioned they are parts by weight.

EXAMPLE I

Charge 1 mol of phenol, 2 mols of formaldehyde (formalin—37% formaldehyde), about 5 mols of water and 0.15 mol of sodium hydroxide (50% aqueous solution) to a reaction kettle. Heat the reaction charge gradually to reflux temperature at atmospheric or slightly reduced pressure and maintain the charge at reflux temperature for 25–40 minutes. Cool the reaction charge to 170–190° F. and add about 0.3 mol of sodium hydroxide (50% aqueous solution). Continue heating the reaction mixture at 170–190° F. for about 50–60 minutes and then add 0.3 mol of sodium hydroxide (50% aqueous solution). After the third addition of sodium hydroxide, cool the reaction medium rapidly to room temperature. The liquid product comprises an aqueous alkaline solution of a condensation product of phenol and formaldehyde having a resin solids content of about 40%. The viscosity of the product is 35–40 MacMichael units measured at 70° F. on a MacMichael viscometer using a 26$d$ wire. Such a solution is known in the art as a "liquid resin."

EXAMPLE II

Part A

To one portion of the liquid resin product produced according to Example I, add 1.25 weight percent on the weight of the liquid resin of a polyethylene glycol having an average molecular weight of about 20,000. The polyethylene glycol can be dissolved in water prior to the addition or it can be added directly to the liquid resin. After a short agitation period, the polyethylene glycol is dispersed throughout the liquid resin and the viscosity of the resultant resin composition is about 105–120 MacMichael units when measured at 70° F. using a 26$d$ wire.

Part B

To a second portion of the liquid resin produced according to Example I, stir in about 2.5 weight percent on the weight of the liquid resin of polyethylene glycol having an average molecular weight of about 20,000. The viscosity of the resultant liquid resin composition is 350–400 MacMichael units when measured at 70° F. using a 26$d$ wire.

Part C

To a third portion of the liquid resin produced according to Example I, add about 6 weight percent on the weight of the liquid resin of a polyethylene glycol having an average molecular weight of about 6,000. The resultant resin composition has a viscosity of about 120–150 MacMichael units when measured at 70° F. using a 26$d$ wire.

Each of the liquid resin compositions containing the polyethylene glycol is stable against viscosity change for extended periods of time when maintained under ordinary room temperatures. When formulated into plywood adhesives by conventional compounding with fibrous fillers, antifoaming agents, etc. and used to prepare 5/16" 3-ply and 13/16" 5-ply panels, excellent adhesion between the plies is obtained and the panels do not delaminate when subjected to boiling water for a period of 4 hours, dried at 140° F. for 20 hours, and then reimmersed in boiling water for 4 hours.

If an attempt is made to increase the viscosity of the liquid resin of Example I by cautious heating after the last alkali addition until a viscosity of 105–120 MacMichael units measured at 70° F. using a 26$d$ wire is obtained, the resulting liquid resin is not stable in storage. When such a resin is formulated into a glue in the manner indicated immediately above, and used to make plywood, the plywood panels exhibit a much lower order of wood failure when subjected to the boiling water test.

The liquid resins of the present invention are products of the type which result from condensation of 1 mol of phenol with 1.5–3.5 mols of formaldehyde carried out in an aqueous medium in the presence of 0.1–2.5 mols of sodium hydroxide. The amount of sodium hydroxide is in excess of that required to catalyze this first stage or condensation reaction in effect providing a highly alkaline phenol-formaldehyde resin. The higher alkaline the resin, the more reactivity exhibited by the resin. Consequently the amount of alkali can be varied within the given range in accordance with the peculiar curing time desired for a given gluing process. The liquid resins generally have a solids content range of about 35–55%. Typical liquid resins are those made according to the various processes disclosed in U.S. Patents 2,360,376; 2,437,981; and Re. 23,347. The sodium hydroxide may be added in increments as described in these U.S. patents or may be added continuously throughout the reaction period.

The polyethylene glycol prescribed for use is at least partially water-soluble and alkali-soluble, and is solid at room temperature. Polyethylene glycols having molecular weights of about 4,000–60,000 are particularly well adapted for present purposes. The choice of polyethylene glycol as to its molecular weight, within the defined range of molecular weights, and more particularly the upper limit of the same, is dependent in a given situation upon the amount of sodium hydroxide present in the phenolic resin. As a general rule, polyethylene glycols having higher molecular weights require higher amounts of sodium hydroxide in order to become effectively solubilized in the liquid resin. In illustration: polyethylene glycols having molecular weights of about 20,000 necessitate that the resin contains greater than about 0.5 mol of sodium hydroxide per mol of phenol. With less than 0.20 mol of sodium hydroxide present in the liquid resin per mol of phenol, polyethylene glycol having a molecular weight of about 4,000 and immediately higher must be used.

The amount of polyethylene glycol which is to be used ranges from 0.1–10.0 weight percent on the weight of the liquid or aqueous alkaline phenol-formaldehyde resin. Polyethylene glycols having higher molecular weights, in the range disclosed, can be used in lesser amounts than those having lower molecular weights to attain resin compounds having the desired properties of viscosity, reactivity and stability. Use of the polyethylene glycols having the highest molecular weight which is soluble in a given phenol-formaldehyde resin is recommended.

The polyethylene glycols are admixed with the liquid aqueous alkaline phenolic resins in any manner devised to give good dispersion of the polyethylene glycols throughout the resins and so attain the desired liquid resin compositions. A preferred method by which to attain this is to solvate the polyethylene glycol in water and stir the same into the phenolic resin.

It will thus be seen that the objects set forth above among those made apparent by the preceding description are efficiently attained and, since certain changes can be made in the resin compositions, the adhesives in which they are utilized and in carrying out the process for their attainment without departing from the scope of the invention, it is intended that the above description is to be interpreted as illustrative and not in a limiting sense.

What is claimed is:

1. A liquid resin composition adapted for use as an adhesive base comprising an aqueous alkaline resin which results from condensing 1 mol of phenol with 1.5–3.5 mols of formaldehyde, in the presence of 0.1–2.5 mols of sodium hydroxide and from 0.10–10.0 weight percent based on the weight of said resin of a polyethylene glycol having a molecular weight of from 4,000 to 60,000.

2. A liquid resin composition as in claim 1 wherein the aqueous alkaline resin is a condensation product of 1 mol of phenol with 2.0 mols of formaldehyde, the amount of sodium hydroxide is 0.75 mol and the amount of polyethylene glycol is 6% on the weight of the resin and the molecular weight of the polyethylene glycol is about 6,000.

3. A liquid resin composition as in claim 1 wherein the aqueous alkaline resin is a condensation product of 1 mol of phenol with 2.0 mols of formaldehyde, the amount of sodium hydroxide is 0.75 mol and the amount of polyethylene glycol is 2.5 weight percent on the weight of the resin and the molecular weight of the polyethylene glycol is about 20,000.

4. A liquid resin composition as in claim 1 wherein the aqueous alkaline resin is a condensation product of 1 mol of phenol with 2.0 mols of formaldehyde, the amount of sodium hydroxide is 0.75 mol and the amount of polyethylene glycol is 1.25 weight percent on the weight of the resin and the molecular weight of the polyethylene glycol is about 20,000.

References Cited in the file of this patent

UNITED STATES PATENTS

| | | |
|---|---|---|
| 2,360,376 | Van Epps | Oct. 17, 1944 |
| 2,620,321 | Schrader et al. | Dec. 2, 1952 |

OTHER REFERENCES

Warth: "The Chemistry and Technology of Waxes," 2nd Edition, Reinhold Pub. Corp., New York (1956), page 450.

"Carbowax Compounds and Polyethylene Glycols," Union Carbide and Carbon Corp. (1946), F–4772, p-18237, page 10.